Patented Aug. 12, 1947

2,425,534

UNITED STATES PATENT OFFICE 2,425,534

P-NITROPHENYL DICHLOROISOBUTYL ETHER

William F. Hester, Drexel Hill, and W. E. Craig, Philadelphia, Pa., assignors to Rohm & Haas Company, Philadelphia, Pa., a corporation of Delaware No Drawing. Application October 25, 1946, Serial No. 705,800

1 Claim. (Cl. 260—612)

This invention relates to nitrophenyl dichloroisobutyl ether and has for its object the provision of a compound having both insecticidal and fungicidal actions upon which are predicated utility in pesticidal compositions for use in horticulture and agriculture.

We have found the compound, $4\text{-NO}_2\text{C}_6\text{H}_4\text{OCH}_2\text{CCl(CH}_3)\text{CH}_2\text{Cl}$ to be a rather unique one in such respects. It may be prepared by reacting p-nitrophenol in the form of its sodium salt with methallyl chloride to form p-nitrophenyl methallyl ether and chlorinating this ether.

By way of example, chlorine gas was passed into 1159 grams of p-nitrophenyl methallyl ether with stirring and sufficient cooling to maintain the temperature of the reaction mixture between 29° C. and 37° C. until a weight increase of 437 grams was obtained. A small amount of hydrogen chloride was evolved. A reddish-brown oil was obtained. This was dissolved in ethylene dichloride, and this solution was washed twice with an aqueous potassium carbonate solution and then with water. It was dried over anhydrous potassium carbonate and the solvent removed by heating on a steam bath under reduced pressure. There was obtained 1497 grams of a dark-brown oil which was principally the desired p-nitrophenyl dichloroisobutyl ether. The product as obtained contained 5.0% of nitrogen and 29.1% of chlorine. Theoretical values are 5.3% and 26.8%, respectively.

This product was dissolved in acetone to form a 25% solution. This solution was stirred into water to yield a suspension which was adjusted to one part of the ether in 833 parts of water. This suspension was sprayed onto bean plants and celery. It effectively controlled anthracnose on beans and Cercospora and Septoria on celery.

A spray containing 1% of p-nitrophenyl dichloroisobutyl ether was applied to bean plants for the control of Mexican bean beetle larvae. A kill of 93% was obtained in twenty-four hours. Sprays at 0.125% were also applied to give kills in various tests averaging 75%.

A 4% dust gave complete control of Colorado potato beetle larvae.

A spray containing 0.25% of p-nitrophenyl dichloroisobutyl ether was applied to potato plants for early blight. While, in control plots treated by the common Bordeau sprays, 44% of the plants showed evidence of disease, only 20% of the plants in three test plots treated with the 0.25% spray showed evidence of disease.

Compositions for control of both insects and fungi on plants may be prepared as has been indicated and applied in the form either of sprays or of dusts. In addition to the acetone solution used for sprays, there may be made solutions in such solvents as Pine oil together with an emulsifying or wetting agent, such as a petroleum sulfonate, a polyglycerol-fatty acid condensate, or a long-chained alkylphenoxypolyethoxyethanol. Dusts may be prepared as concentrations of 0.25% to 5% in such finely divided solids as talc, clay, chalk, magnesium carbonate, walnut shell flour, and the like. Both sprays and dusts are effective against many common fungi and insects on plants.

We claim:

As a new chemical compound, $4\text{-NO}_2\text{C}_6\text{H}_4\text{OCH}_2\text{CCl(CH}_3)\text{CH}_2\text{Cl}$

WILLIAM F. HESTER.
W. E. CRAIG.